United States Patent [19]

Miller et al.

[11] 4,252,368
[45] Feb. 24, 1981

[54] DUAL SEAT FOR MATERIAL HANDLING EQUIPMENT

[75] Inventors: Larry E. Miller; John M. Baylor, both of Bettendorf, Iowa

[73] Assignee: J. I. Case Company, Racine, Wis.

[21] Appl. No.: 64,114

[22] Filed: Aug. 6, 1979

[51] Int. Cl.³ .............................................. B60N 1/02
[52] U.S. Cl. ................................ 297/235; 297/112; 297/244; 297/379
[58] Field of Search ............... 297/244, 234, 235, 238, 297/112, 379, 378, 331, 335, 92, 349

[56] References Cited

U.S. PATENT DOCUMENTS

| | | | |
|---|---|---|---|
| 415,971 | 11/1889 | Kerr | 297/235 |
| 466,773 | 1/1892 | Clarkson | 297/235 |
| 1,412,139 | 4/1922 | Schechter | 297/234 |
| 2,927,818 | 3/1960 | Ferrara | 297/112 X |
| 3,243,228 | 3/1966 | Watts et al. | 297/92 |
| 3,893,728 | 7/1975 | Holopainen | 297/349 X |
| 4,010,977 | 3/1977 | Rahman | 297/92 |

FOREIGN PATENT DOCUMENTS

562078  5/1957  Italy ........................................ 297/335
1086973 10/1967  United Kingdom .................... 297/378

*Primary Examiner*—Francis K. Zugel
*Attorney, Agent, or Firm*—Dressler, Goldsmith, Shore, Sutker & Milnamow, Ltd.

[57] ABSTRACT

A dual seat arrangement for an earthworking vehicle consists of a first seat including a seat cushion fixed to the vehicle body and a backrest pivotally supported on the vehicle body about a generally horizontal first pivot axis. A second rearwardly facing seat is pivoted on the vehicle body about a second parallel horizontal axis and the backrest and second seat are interconnected by a rigid link so that the two move as a unit between generally horizontal and generally vertical positions which respectively define the operative position for the rearwardly facing seat and the operative position for the forwardly facing backrest. A single releasable latch means is utilized for defining the upright position while the generally horizontal position is defined by supporting the seat directly on the vehicle frame structure.

7 Claims, 4 Drawing Figures

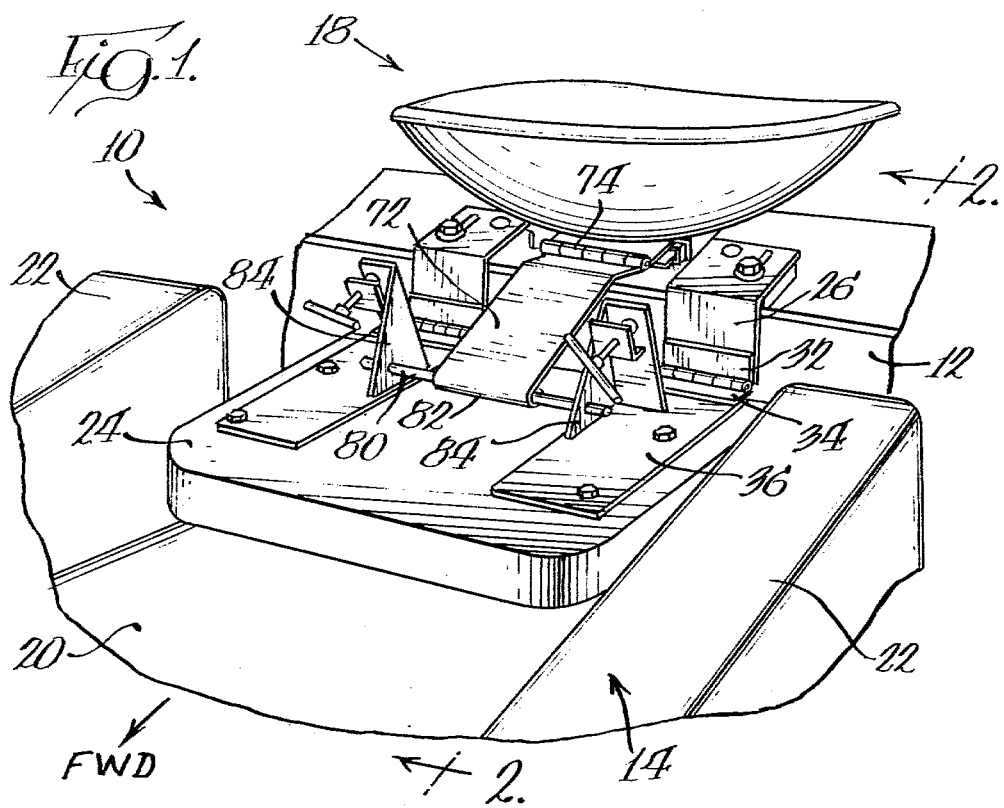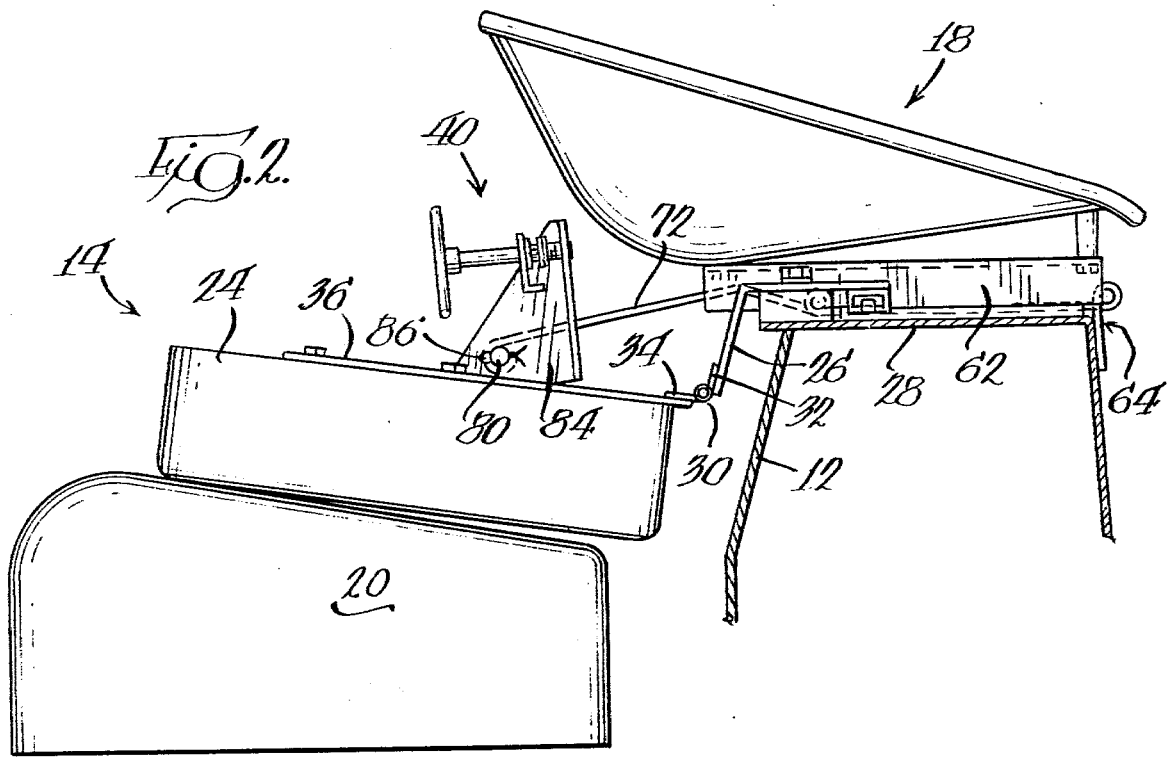

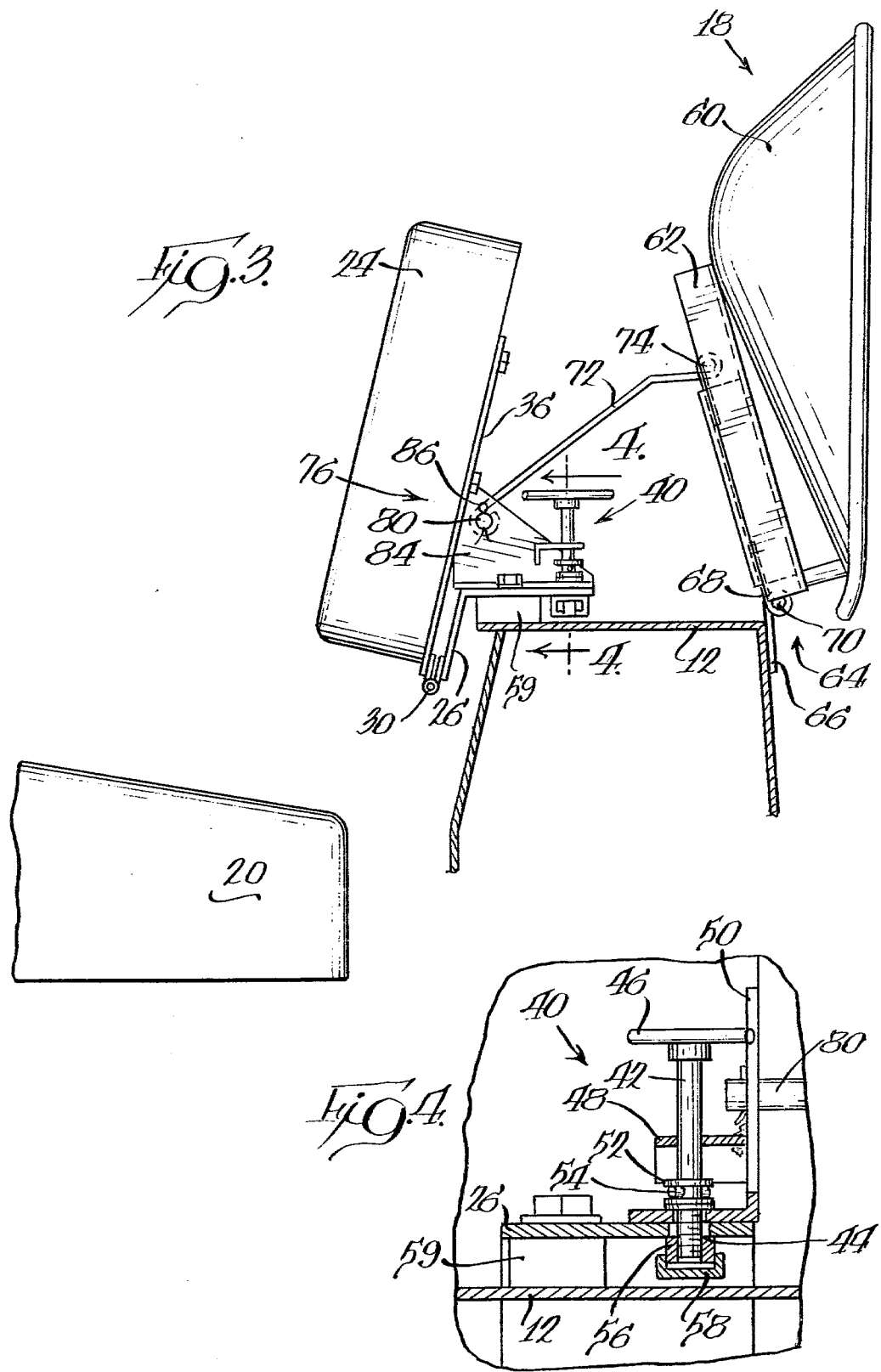

DUAL SEAT FOR MATERIAL HANDLING EQUIPMENT

DESCRIPTION

1. Technical Field

The present invention relates generally to a seating arrangement for a vehicle and more specifically to a seating arrangement wherein the operator can be facing in opposite directions for performing different functions.

In conventional vehicles such as earthworking equipment, a common arrangement is to provide digging equipment such as a backhoe on the rear end of a vehicle. In many instances, this type of equipment also has an earthworking implement on the forward end of the vehicle to increase the versatility thereof.

In vehicles of this type, it is customary to have a separate set of controls for the backhoe on the backhoe frame to manipulate the digging attachment. This, of necessity, requires the operator to face rearwardly when manipulating the backhoe. However, when the vehicle is moved from one site to another, or when the second material handling implement is being utilized, the operator must face forwardly.

2. Background Prior Art

Various proposals have been made for providing a dual seat arrangement for vehicles having backhoes or other attachments on the rear end thereof so that the operator can be facing in opposite directions for performing the respective functions. Examples of such devices are disclosed in U.S. Pat. Nos. 3,246,926; 3,300,172; and 4,010,977.

These patents disclose a seating arrangement specifically designed for a tractor that has a backhoe or material handling implement at the rear end thereof. However, all three of these disclosures have serious drawbacks in utilizing only a single seat that is moved to two different positions. Such an arrangement does not accommodate for the difference in contour of the seat cushion as well as the back rest that is normally desirable in providing adequate comfort for the operator. Furthermore, the seating arrangements disclosed in these patents require a substantial amount of space for manipulating the seat between the two positions.

It will be appreciated that when a backhoe attachment is assembled to a tractor it should be positioned as close as possible to the rear of the tractor to maintain a good tractor balance when the implement is being transported from one job site to another. To accomplish this, it is desirable to have the backhoe boom as close as possible and preferably tilted forwardly of the vertical axis extending through the pivot point for the boom. In this position, there is limited space for the operator's seat and dual position seating arrangement of the type disclosed in the above patents are not satisfactory for several reasons. The primary reason is that the limited space makes it difficult to accommodate a two position seat of the type disclosed in the above patents. Furthermore, the linkages required for defining the two positions for the seat are rather complicated adding to the overall cost of the unit.

Another area that has received attention in seating arrangements is the fact that in most instances it is desirable to have the operator seated at a lower level when operating the tractor and at a higher level when operating the backhoe equipment.

To provide for such differences, it has also been proposed to provide two completely separate seats for the tractor and the backhoe unit with the seat for the backhoe unit either being supported on the tractor frame or on the backhoe frame. In this respect, the assignee of the present invention has for some time sold a vehicle having such a seating arrangement as a Case 450 vehicle. The seating arrangement for this vehicle consists of two separate seats with the forwardly facing or tractor seat being formed with a fixed cushion that is supported on the vehicle frame and a backrest pivoted on the vehicle frame between an upright position and a generally horizontal position. The backhoe seat or rearwardly facing seat comprises a contoured seat cushion which is pivotally supported adjacent its front edge to be pivoted between a generally horizontal operative position and a vertical stored position.

In operation, when the tractor seat is to be utilized, the backrest is moved to an upright position and is latched by suitable latching means while the backhoe seat is also raised to an inoperative position and held in such position by a separate latching mechanism. Of course, if the position of the seats is to be reversed, those latching mechanisms must be released and the seat and backrest manipulated into proper position where they are again releasably retained.

SUMMARY OF THE INVENTION

According to the present invention, a dual seating arrangement for an earthworking implement on a vehicle includes a first seat having a seat cushion supported on the vehicle body and a backrest pivotally supported on the vehicle and movable between generally horizontal and generally upright positions. The second seat consists of an oppositely facing seat member which has its forward edge pivoted about a generally horizontal pivot axis and movable between first and second or horizontal and upright positions. The two seats are interconnected and are retained in the respective positions by a single latch mechanism to considerably decrease the cost of manufacturing the unit. More specifically, the interconnecting means consists of a single rigid link that has one end pivotally connected to the backrest and an opposite end pivotally connected to the second seat.

The pivotal connection for the second seat on the vehicle frame as well as the pivotal connection between the single link and the backrest are removable so that the backhoe seat can readily be removed when the backhoe is removed to increase the visibility for the operator.

With the arrangement described above, the respective seats can be positioned at the desired level for most efficient operation and require only a single latching mechanism for latching both seats in the respective operative and inoperative positions.

BRIEF DESCRIPTION OF SEVERAL VIEWS OF DRAWINGS

FIG. 1 is a fragmentary perspective view of the operator's compartment of a vehicle having the present invention incorporated therein;

FIG. 2 is a fragmentary sectional view as utilized along line 2—2 of FIG. 1;

FIG. 3 is a view similar to FIG. 2 showing the respective seats in a second position;

FIG. 4 is a fragmentary cross-sectional view as viewed along line 4—4 of FIG. 3.

DETAILED DESCRIPTION

While this invention is susceptible of embodiment in many different forms, there is shown in the drawings and will herein be described in detail an embodiment with the understanding that the present disclosure is to be considered as an exemplification of the principles of the invention and is not intended to limit the invention to the embodiment illustrated.

FIG. 1 of the drawings generally discloses an operator station, designated by reference numeral 10, for an earthworking implement or a vehicle of the type disclosed in U.S. Pat. No. 3,377,984, incorporated herein by reference. This patent discloses a wheeled vehicle or tractor which has a conventional type of backhoe unit attached to the rear end thereof which is manipulated by moving control levers that are supported on the backhoe frame which is attached to the vehicle frame.

As indicated above, it is customary to provide a dual seating arrangement for such a vehicle so that one seating arrangement provides a rearwardly facing seat directed towards the controls for the backhoe unit and the other a forward facing seat which is directed towards the normal direction of operation of the tractor or vehicle.

According to the present invention, the dual seating arrangement is provided with a minimum number of parts that can readily be incorporated into any standard size unit and wherein the respective seats are in an appropriate position with respect to the controls for the vehicle and the backhoe frame, respectively.

As illustrated in FIG. 1, the dual or plural seat arrangement is supported on vehicle frame 12 and consists of a forwardly facing tractor seat 14 and a rearwardly facing backhoe seat 18 both supported on vehicle body or frame 12. The forwardly facing seat 14 consists of a seat cushion 20 that is supported directly on vehicle body or frame 12 and has a pair of arm rests 22 extending upwardly from opposite side edges thereof. Seat 14 also has a backrest 24 which is movable between a generally horizontal stored position, illustrated in FIG. 1, and a generally vertical upright position, illustrated in FIG. 3. For this purpose, vehicle body 12 has a generally L-shaped bracket 26 that extends forwardly from a horizontal shelf portion 28 of vehicle body and downwardly to terminate at a lower edge. A hinge 30 has one leaf 32 fixedly secured to the lower edge of L-shaped bracket 26 and a second leaf 34 fixedly secured to a rigid element 34 forming part of backrest 24. As illustrated in FIG. 1, two such identical support structures 26–36 are located adjacent opposite edges of backrest 24.

Backrest 24 also includes a releasable latch means 40 for maintaining the backrest 24 in an upright or operative position illustrated in FIG. 3. The specific latch mechanism that has been illustrated is shown in detail in FIG. 4 and includes a rod or bolt 42 that is threaded at 44 on one thereof and has a handle 46 at the opposite end. Rod 42 is supported on a bracket 48 that extends from a further bracket 50 secured to member 36. Rod 42 is rotatably supported on bracket 48 through collars 52 and a spring 54. The lower end or threaded portion 44 of bolt 42 cooperates with a nut 56 that is supported on a portion of L-shaped bracket 26 through a cage 58. For this purpose, bracket 26 is spaced from shaft 28 by a spacer 59.

The releasable latch means 40 is thereby capable of securely fixing the backrest 24 in the position illustrated in FIG. 3 by moving the backrest to the generally vertical position and then rotating bolts 42 into threaded nuts 56 until releasable latch means 40 is in the position illustrated in FIG. 4.

Considering now the backhoe or rearwardly facing seat 18, this seat consists of a rigid pan structure or member 60 that has a bracket 62 fixedly secured to the lower end thereof and is pivotally supported on vehicle frame 12 through a hinge 64. Hinge 64 consists of a first element 66 (FIG. 3) that is fixedly secured to vehicle body 12 and a second element 68 secured to bracket 62 with elements 66 and 68 interconnected by a removable rod 70. Removable rod is retained in position by cotter pins (not shown).

According to the present invention, the backrest 24 and seat 18, specifically pan 60, are interconnected to move as a unit between two positions illustrated respectively in FIGS. 2 and 3. As illustrated in FIG. 3, interconnecting means consists of a single rigid link 72 that has one end pivotally connected to bracket 62 through a pivot pin 74 and the opposite end thereof connected to backrest 24 through a second pivotal connection 76. The second pivotal connection 76 is most clearly illustrated in FIG. 1 and consists of a rod 80 that extends through a sleeve 82 defined on one end of rigid link 72 with opposite ends of rod 80 extending through openings in bracket portions 84 that form part of rigid member 36. The opposite ends of rod 80 have openings (not shown) for receiving cotter pins 86 (FIG. 2).

Thus, the rigid link or interconnecting means 72 will cause the backrest 24 and seat 18 to simultaneously move as a unit between first and second positions respectively illustrated in FIGS. 2 and 3. As shown in FIG. 2, the first position, wherein both the backrest 24 and the pan 60 are in a generally horizontal position, is defined by having bracket 62 engage the upper surface of the horizontal shelf portion 28 of vehicle body 12. In this position, the backrest 24 is in a stored position generally overlying a portion of seat cushion 20. The second or generally vertical position for the seat 18 and backrest 24 is, as explained above, defined by releasable retaining means 40 as illustrated in FIG. 3.

In summary, the backrest 24 and seat 18 are interconnected by a simple link which will cause the two to move as a unit between the respective positions and only a single latch mechanism 40 is necessary for holding the two units in the upright position or operative position for the backrest and the inoperative position for the seat 18. By utilizing the arrangement described above, the respective seats can be positioned in a very close confined area to allow the backhoe unit to be positioned as close as possible to the center of gravity for the tractor and thereby increase the stability or balance for the vehicle when it is being transported from one job site to another. Of course, only a limited number of parts are necessary and these parts are readily available elements that can be procured at a minimum cost.

Another advantage of the structure described above is the fact that the seat 18 can readily be removed and the backrest 24 can be retained in operative and inoperative positions through the same latch means 40. This can be accomplished by removing pin 70 from hinge 64 and removing rod 80 so that link 72 and the seat 18 can be removed. This may be desirable at times when the backhoe unit is removed from the tractor or vehicle and the vehicle is used for other purposes.

It should also be noted that when rearwardly facing seat 18 is in the inoperative or generally vertical position, the seat is protected from the elements, such as dirt and rain.

While a particular specific embodiment of the invention has been shown and described, various modifications will come to mind without departing from the spirit of the invention. For example, any type of releasable latch means 40, such as a cam actuated latch or a spring loaded latch mechanism could be substituted for the threaded latch 40. Also, the single interconnecting link 72 could also be designed such that a single latch mechanism rather then a pair of latch mechanisms could be used.

We claim:

1. A plural seat arrangement for an earthworking implement on a vehicle body comprising a first seat having a seat cushion supported on said body and a backrest pivotally supported on said vehicle body about a generally horizontal first pivot axis, said backrest being movable between a generally horizontal stored position and a generally vertical upright position, a second seat pivoted on said vehicle body about a second pivot axis extending parallel to said first pivot axis, said second seat being movable from a generally horizontal operative position to a generally vertical position, and interconnecting means between said second seat and backrest causing simultaneous movement of said second seat and backrest between said positions.

2. A plural seat arrangement as defined in claim 1, further including releasable latch means for retaining said backrest in said upright position and said second seat in said vertical position.

3. A plural seat arrangement as defined in claim 2, in which said interconnecting means includes a rigid link having one end pivotally connected to said backrest and an opposite end pivotally connected to said second seat.

4. A plural seat arrangement as defined in claim 3, in which said second pivot axis is defined by a removable pin and the pivotal connection between said rigid link and said backrest includes a removable rod so that said second seat can be separated from said vehicle by removing said pin and rod.

5. In a vehicle including an elongated body having a forward end and a rear end with an operator's station adjacent said rear end and a material handling implement on said rear end thereof, a dual seat arrangement in said operator's station comprising a forward seat and a rear seat, said forward seat including a seat cushion fixed to said body and a backrest pivotally supported about a horizontal pivot axis on said body rearwardly of said seat cushion, said backrest being movable between generally horizontal and upright positions, said rear seat including a member pivoted about a second axis parallel to said horizontal axis, linkage means between said backrest and said member causing movement of said member from a generally horizontal position to a generally vertical position when said backrest is moved between positions, and means maintaining said backrest and member in the respective positions.

6. A vehicle as defined in claim 5, in which said linkage means includes a single rigid link having one end pivotally connected to said backrest and an opposite end pivotably connected to said second seat with both pivotal connections spaced from said pivot axes.

7. A vehicle as defined in claim 6, in which said last means includes releasable latch means between said backrest and said body defining said vertical position for said second seat and said upright position for said backrest, and said second seat is supported on said body to define said horizontal position for said second seat and said backrest.

* * * * *